United States Patent [19]

Yu

[11] Patent Number: 5,016,302
[45] Date of Patent: May 21, 1991

[54] MOTIVE AIR SEAT CUSHION

[76] Inventor: Kaung M. Yu, 13618 Braeswest Dr., Houston, Tex. 77482

[21] Appl. No.: 449,751

[22] Filed: Dec. 13, 1989

[51] Int. Cl.⁵ ............................................. A47C 31/00
[52] U.S. Cl. ........................................ 5/423; 5/469; 297/180
[58] Field of Search ............... 5/423, 469, 421, 461, 5/453, 468; 297/453, 180

[56] References Cited

U.S. PATENT DOCUMENTS

| | | | |
|---|---|---|---|
| 376,094 | 1/1888 | Hurlburt | 5/468 |
| 2,703,134 | 3/1955 | Mossor | 297/180 |
| 2,758,532 | 8/1956 | Awe | 297/180 |
| 2,791,956 | 5/1957 | Guest | 297/180 |
| 2,826,135 | 3/1958 | Benick | 297/180 |
| 2,931,286 | 4/1960 | Fry | 297/180 |
| 3,757,366 | 9/1973 | Sacher | 5/423 |
| 4,413,857 | 11/1983 | Hayashi | 297/453 |
| 4,685,727 | 8/1987 | Cremer | 5/468 |
| 4,853,992 | 8/1989 | Yu | 5/469 |

FOREIGN PATENT DOCUMENTS

| | | | |
|---|---|---|---|
| 1655803 | 7/1970 | Fed. Rep. of Germany | 297/180 |
| 1420221 | 1/1976 | United Kingdom | 5/434 |

Primary Examiner—Gary L. Smith
Assistant Examiner—F. Saether

[57] ABSTRACT

A motive air seat cushion comprises: an envelope with an air inlet opening and air discharge openings around the edges. An air distribution box having a plurality of holes around the edges is located inside the envelope and connected to the air inlet opening. A flexible hollow supporting padding is embedded inside the envelope to provide void spaces and also support for the envelope. As air from a motive air source flows into the air distribution box and then diffuses evenly through the envelope, the cushion is cooled or warmed, thus giving a cooling or warming sensation to a person sitting on the cushion.

11 Claims, 2 Drawing Sheets

MOTIVE AIR SEAT CUSHION

BACKGROUND OF THE INVENTION

This invention relates to the seat cushions, and more particularly to a motive air seat cushion that provides a cooling/warming sensation for a person to sit on.

The present invention is an improvement on the invention covered by U.S. Pat. No. 4,853,992 to Kaung M. Yu.

As illustrated in U.S. Pat. No. 4,853,992 an air cooled/heated seat cushion comprised an envelope embedded with support padding, a partitioning wall having holes located inside one edge of the envelope to form a distribution channel, an air inlet opening to the channel, and an air discharge opening at the other edges of the envelope. The envelope and the distribution channel are formed as an integrated structure. Conventional seat cushions preceding that of U.S. Pat. No. 4,853,992 had very little success in providing cooling or warming sensation to an occupant due to the fact that inside the cushions either the air is almost stagnant without motive air applied, or the padding obstructs the air to pass through the envelope. The present invention departs from previous concepts by providing a seat cushion which contains an air distribution box embedded inside the cushion. An air tube is connected between the box and an air source. The motive air from the air source flows through the box and diffuses through the cushion, thus cooling or warming the person sitting on it.

The present invention utilizes to the fullest advantage of an independent air distribution box inside the envelope, and results in a seat cushion with an evenly cooling/warming sensation to a person sitting on it.

An another important advantage of the present invention is that there are no potential leakages beyond the distribution holes around the box. As illustrated in U.S. Pat. No. 4,853,992, the air channel connected to the envelope may develop leakages around the joints and results in uneven air distribution through the envelope.

Accordingly, an important object of the present invention is that the air distribution box being a separate unit which is placed inside the envelope but is not connected to the envelope. Another object of the present invention is to produce a seat cushion which is simple in construction and suitable for mass production at a low cost. Further objects and advantages of my invention will become apparent from a consideration of the drawings and ensuing descriptions thereof.

SUMMARY OF INVENTION

According to the present invention, a motive air seat cushion comprises an envelope consisting of top and bottom wall members. The two wall members are connected to each other around the edges. An air distribution box having a plurality of holes around the edges is located inside the envelope. An air inlet opening is connected to the box through the envelope for permitting air to enter the box. Air discharge openings are located around the edges of the envelope for air to exit. Flexible hollow supporting paddings are provided inside the box and the envelope, thus allowing air to enter the box and diffuse through the envelope.

BRIEF DESCRIPTION OF THE DRAWINGS

The present invention will now be explained with reference to the accompanying drawings, in which.

DETAILED DESCRIPTION OF THE INVENTION

Figure 1:
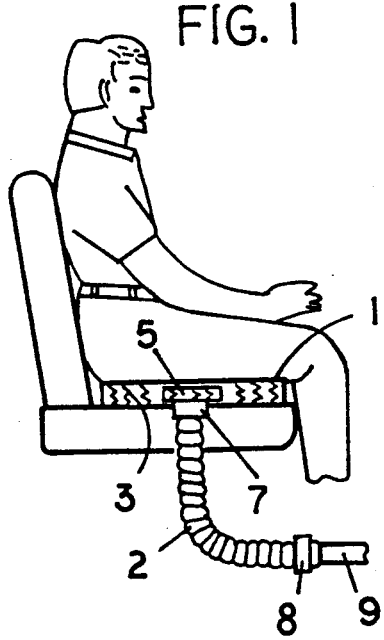
FIG. 1 is a cross-sectional view of the motive air seat cushion with a person sitting on it.

As shown in FIG. 1 there is an embodiment of this invention. The seat cushion is in-between a person and a seat. The cushion includes an envelope 1 and an air tube 2. Inside the envelope 1 there are air distribution box 5 and flexible hollow supporting padding 3. One end of the air tube 2 is connected to the box 5 through envelope 1 by any suitable cushion coupler 7. The other end of the tube 2 is connected to an air source 9 by any suitable air source coupler 8. Envelope 1 has top and bottom wall members. The two wall members are connected to each other around the edges. It is to be understood that any suitable means such as heat welding, stitching, gluing, or the like may be used for connecting the two members of the envelope 1. It is also to be understood that the envelope 1 may be permanently attached to a seat, and formed as a part of the seat.

Figure 2:
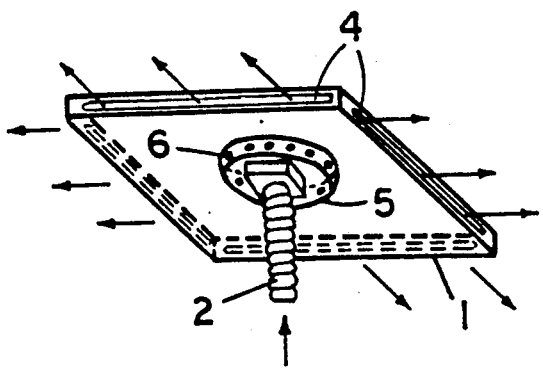
FIG. 2 is an interior view taken in the direction of the back of the seat cushion.

FIG. 2 shows the overall view of the seat cushion. Air distribution box 5 is located inside envelope 1. Envelope 1 and box 5 may be made of flexible vinyl, plastic, leather, fabric with vinyl backing, tightly knitted fabric, or other material with low air penetrability. Also envelope 1 and box 5 may be made of different materials. A plurality of air holes 6 are located around the edge wall of the box 5 for distributing air throughout the envelope 1. Air discharge openings 4 are located around the edge wall of the envelope 1 for air to exit. For clarity reasons, the padding 3 is not shown.

Figure 3:
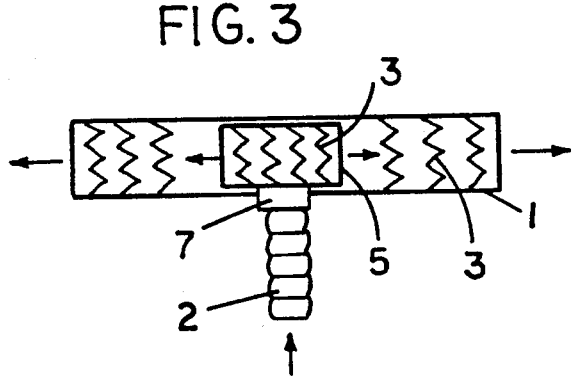
FIG. 3 is an enlarged view of the seat cushion shown with paddings embedded inside the envelope and the air distribution box.
Figure 5:
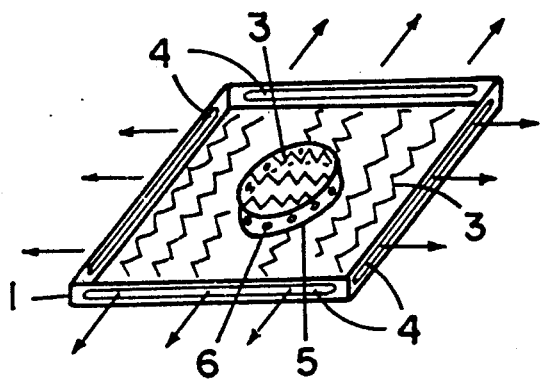
FIG. 5 is a top interior view of the seat cushion shown in FIG. 3.

As shown in FIGS. 3 and 5, there are flexible hollow supporting paddings 3, which act as supporting media for envelope 1 and box 5, which also provide void space for motive air to flow through the box 5 and envelope 1. The paddings 3 may be in the shape of coils, wires, corrugations, protrusions, channels, or other suitable configurations. The material of padding 3 may be metal, plastic, rubber, or other suitable compositions.

Figure 4:
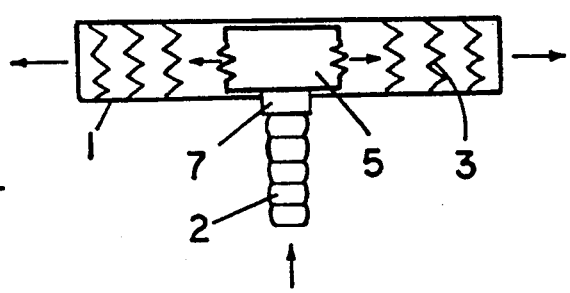
FIG. 4 is an enlarged view of the seat cushion with a self-supporting air distribution box and padding embedded inside the rest of the envelope.
Figure 6:
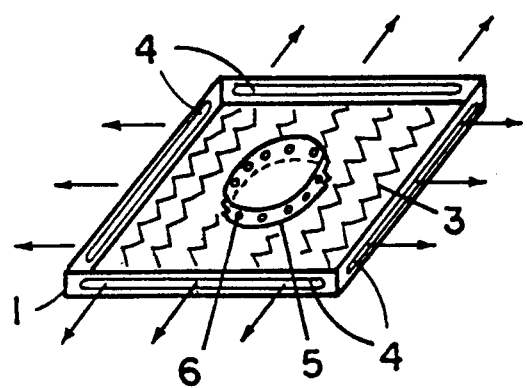
FIG. 6 is a top interior view of the seat cushion shown in FIG. 4.

FIGS. 4 and 6 show another embodiment of the present invention. Air distribution box 5 is made of self-supporting material, and without any padding 3 embedded within. The top and bottom members of the box 5 may be in the shape of circular, semi-circular, rectangular, or other suitable shapes. The edge walls of the box 5 can be bellow type with accordion pleats, or other suitable resilient types. It is apparent from FIGS. 3 and 4 that the air distribution box 5 and envelope 1 have approximately the same thickness. An important aspect of this invention is that the box 5 is a separate component and is without any connection to envelope 1 except at cushion coupler 7. Certain advantages of the present arrangement should be stressed (a) It is simpler in manufacturing separate components than a combined unit; (b) any difference in lateral movement between the top and bottom members of the envelope will not tear the box 5 and cause unwanted air leakages; (c) near the top of box 5, which is the initial contact area with the incoming motive air, the combined layer of the envelope 1 and the box 5 will result in lower heat transfer and minimizing over-cooling or over-heating sensation to a person sitting on it.

The air discharge openings 4 shown in FIGS. 2, 5, and 6 can be located on the top member of the envelope 1 near the edges. It is advantageous to include a plurality of air seeping holes in both members of the envelope to provide some direct ventilation and to reduce moisture condensation on the surface of the envelope 1.

Figure 7:
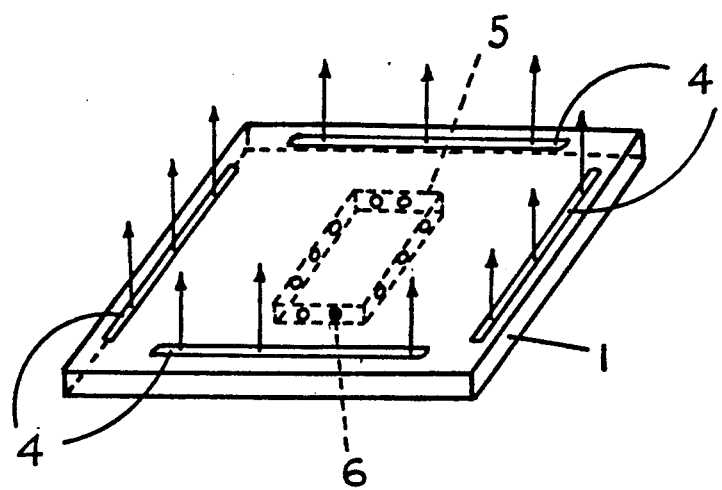
FIG. 7 is a top view of another modification of the seat cushion.

FIG. 7 shows another embodiment of the present invention. The air distribution box 5 is shown as rectangular shape, and the air discharge openings 4 are located on the top member of the envelope 1 near the edges. For clarity reasons, the padding 3 is not shown.

CONCLUSION, RAMIFICATION AND SCOPE OF INVENTION

The described embodiments are to be considered in all respects as illustrative and not restrictive since the invention may be embodied in other specific forms without departing from its spirit or essential characteristics. Therefore the scope of the invention is indicated by the claims rather than by the foregoing description, and all changes which come within the meaning and range of the equivalents of the claims are intended to be embraces therein.

What I claim is:

1. An air conditioned seat cushion for providing a cooling/warming sensation to a person, comprising:
   a flexible envelope having edges which connect a top and a bottom,
   a flexible air distribution box, having a plurality of holes around edge walls, and located inside said envelope,
   padding means embedded inside said envelope and said box, said padding being flexible and having void spaces for diffusing air within said box and said envelope,
   means defining an air inlet opening formed at an outside of said envelope and connected to said box for permitting air to enter said envelope,
   means defining air discharge openings formed along substantially the entire length of each edge of said envelope for discharging air out of said envelope.

2. The invention of claim 1 wherein said air discharge openings have a plurality of holes.

3. The invention of claim 1 wherein said air discharge openings are located on the top of said envelope.

4. The invention of claim 1 wherein said envelope and said box includes a plurality of air seeping holes which allow only a small amount of air may seep through.

5. The invention of claim 1 wherein said envelope and said box are made of a material characterized by vinyl, plastic, leather, fabric with vinyl backing, tightly knitted fabric having low air penetrability, and a combination of these, whereby the majority of the air flows through said envelope instead of penetrating out of said envelope.

6. The invention of claim 1 wherein said padding is made of a material characterized by metal, plastic, rubber, and a combination of these, and having a shape characterized by coils, wires, corrugations, protrusions, and channels, whereby the air can diffuse through said padding and contact with said envelope.

7. The invention of claim 1 wherein said envelope is permanently attached to a seat, and formed as an integral piece.

8. The invention of claim 1 wherein said envelope and said box are made of different materials.

9. The invention of claim 1 wherein said box is made of circular shape.

10. The invention of claim 1 wherein said box is made of rectangular shape.

11. An air conditioned seat cushion for providing cooling/warming sensation to a person, comprising:
    a flexible envelope having edges which connect a top and a bottom,
    a flexible and self-supporting air distribution box, having a plurality of holes around edge walls, and located inside said envelope,
    padding means embedded inside said envelope, said padding being flexible and having void spaces for diffusing air within said envelope,
    means defining an air inlet opening formed at an outside of said envelope and connected to said box for permitting air to enter said envelope,
    means defining air discharge openings formed along substantially the entire length of each edge of said envelope for discharging air out of said envelope.

* * * * *